United States Patent [19]

Kondo

[11] Patent Number: 5,183,148
[45] Date of Patent: Feb. 2, 1993

[54] SCREW FEEDER

[75] Inventor: Fumio Kondo, Chiba, Japan

[73] Assignee: Tokyo Automatic Machinery Works, Ltd., Tokyo, Japan

[21] Appl. No.: 647,227

[22] Filed: Jan. 29, 1991

[30] Foreign Application Priority Data

Sep. 17, 1990 [JP] Japan .................................. 2-248001

[51] Int. Cl.⁵ ............................................. B65G 33/34
[52] U.S. Cl. .................................... 198/674; 198/672; 414/326
[58] Field of Search .................. 198/550.1, 550.6, 661, 198/672, 674, 675; 414/218, 326

[56] References Cited

U.S. PATENT DOCUMENTS

| 701,636 | 6/1902 | Smith et al. |  |
|---|---|---|---|
| 2,441,100 | 5/1948 | Marsden | 198/672 |
| 3,532,233 | 10/1970 | Skelton | 198/674 X |
| 4,774,848 | 10/1988 | Zupancic | 198/672 X |
| 4,826,361 | 5/1989 | Merz | 198/674 X |

FOREIGN PATENT DOCUMENTS

| 248961 | 8/1966 | Austria . |  |
|---|---|---|---|
| 629358 | 4/1936 | Fed. Rep. of Germany . |  |
| 3608551 | 9/1987 | Fed. Rep. of Germany . |  |
| WO86/03180 | 6/1986 | PCT Int'l Appl. . |  |
| 1479392 | 5/1989 | U.S.S.R. | 198/672 |

OTHER PUBLICATIONS

European Search Report.

Primary Examiner—Joseph E. Valenza
Assistant Examiner—Tuan N. Nguyen
Attorney, Agent, or Firm—Sandler, Greenblum & Bernstein

[57] ABSTRACT

A screw feeder is provided having a lower screw shaft and an upper drive shaft which are detachably connected to each other. The drive shaft includes an outer tubular member, with an inner, generally solid, connecting member positioned within the drive shaft. The lower end of the tubular member of the drive shaft includes a generally tapered recess which is adapted to mate with a lower end of the connecting rod positioned therein. The lower end of the connecting rod has a plurality of generally axially arranged slits which make the lower rod end flexible, with the lower end having a generally frustoconical outer surface. The upper end of the screw shaft is adapted to be attached to the lower end of the drive shaft by at least one annular member which engages one of the shafts. The annular member has two inwardly protruding pins, with the lower end of the drive shaft having a portion with two generally L-shaped opposed recesses which are adapted to engage the pins. An upper end of the screw shaft has a throughbore which is adapted to be aligned with two opposed holes in the annular member, in order to attach the annular member to the top of the screw shaft by inserting a truncated frustoconical pin therein.

16 Claims, 3 Drawing Sheets

SCREW FEEDER

DESCRIPTION OF THE INVENTION

1. Technical Field of the Invention

The present invention generally relates to a screw feeder which is adapted to be installed, e.g., in a bag producing, filling and packaging machine for transporting food, medicine or other products in a sanitary fashion. The present invention more particularly relates to a screw feeder which can be used with an apparatus having an outer pipe which is positioned vertically at the lower end of a hopper; wherein the screw feeder includes a screw shaft positioned in the outer pipe so as to transport, e.g., a particulate substance or a gel-like substance by rotating a driving shaft which is connected to the screw shaft

2. Discussion of Background Information

Conventional types of screw feeders, as noted above, have a screw shaft and a driving shaft, with a driving shaft end and the screw feeder base end being connected to each other along an axis by means of a screw. Each time the particulate substance or the gel-like substance to be transported is changed, or the amount of material fed at any given moment is changed, the screw can be loosened, and the screw shaft can then be separated from the driving shaft, so that the screw shaft can be replaced or cleaned.

OBJECTS OF THE INVENTION

However, when utilizing a conventional screw feeder as described above, because the screw shaft and the driving shaft are connected to each other by a screw, it is possible that the screw can become untightened and/or come off upon rotation of the two shafts. It is thus also possible for trouble to occur when the loosened screw is mixed into a particulate substance or a gel-like substance which is being transported. Additional problems arise in that, since the head of the screw can partially extend into the space between the hopper, the screw shaft and the driving shaft, a particulate substance or gel-like substance will likely stick around the screw; as a result, such screws have inferior sanitary properties. Further, in such a case, in order to turn the screw, it is necessary to move a tool into the hopper, with the resultant relatively low operability. In other words, it is difficult to rotate the screw (when necessary or desired) without an awkward placement of a tool into the hopper.

It is, therefore, an object of the present invention to detachably connect a screw shaft and a driving shaft to each other without using a detachable screw.

SUMMARY OF THE INVENTION

In order to solve the above-noted problems, the present invention includes a driving shaft shaped in the form of a tube, with a connecting rod positioned within the tube. The connecting rod is provided for reciprocal movement along the axial direction of the driving shaft. The driving shaft also includes a recessed portion in which a base end of the screw shaft will be fitted, with the connecting rod having slit portions which divide a circumferential wall of a recessed portion thereof in a generally circumferential direction, the slit portions being formed in an axial direction at one end of the connecting rod. A frustoconical face portion is formed on an outer circumferential face of the circumferential wall of the recessed portion so that the diameter of the frustoconical portion will gradually increase, in a direction as viewed towards the screw shaft. Further, a tapered, frustoconical portion is formed, in opposed relationship to the frustoconical face portion, along an inner circumferential face of the driving shaft tube, in order to engage the frustoconical outer surface portion of the connecting rod, along the axial direction.

In the present invention, if the base end of the screw shaft is pushed into the recessed portion, the connecting rod moves towards the screw shaft until the frustoconical surface portion and the tapered surface portion are no longer engaged with each other, but instead include a gap between them. In this case, the circumferential wall of the recessed portion of the connecting rod will expand so that the base end of the screw shaft will fit into the recessed portion; and, if the connecting rod is moved in an opposite direction in this situation, the frustoconical face portion will become engaged with the tapered portion to compress and tighten the circumferential wall of the recessed portion so that the driving shaft and the screw shaft wall are then attached integrally to each other.

In a first aspect of the present invention, a screw feeder has an outer pipe and a hopper, with the outer pipe being positioned vertically below a lower end of the hopper. The outer pipe includes a screw shaft adapted to transport a substance in the hopper in response to rotation of a driving (i.e., drive) shaft which is connected to the screw shaft. The driving shaft comprises a tube, with a connecting rod being positioned on the inside of said tube, said connecting rod being adapted to reciprocate along the axial direction of the driving shaft. The driving shaft further comprises a recessed portion into which a base end of said screw shaft is positioned, with the connecting rod having slit portions which comprise means for dividing a circumferential wall of said recessed portion in a generally circumferential direction. The slit portions are formed in a generally axial direction at an end of said connecting rod, with a frustoconical face portion being provided along an outer circumferential surface of said circumferential wall of said recessed portion, wherein the diameter of said frustoconical portion gradually increases in a direction towards said screw shaft. A tapered portion is also formed, in opposed, generally complementary relationship to said frustoconical portion, along an inner circumferential face of said tubular driving shaft, said tapered portion being adapted to engage said frustoconical portion in an axial direction.

In a second aspect, the present invention provides a screw feeder for feeding material in a hopper, the screw feeder including a driving shaft, a screw shaft, and means for detachably connecting one end of the screw shaft to one end of the driving shaft, wherein said connecting means includes a detachable connection means having elements which can be separably attached to both said driving shaft and said screw shaft.

In yet a third aspect of the present invention, a screw feeder includes an elongated driving shaft having a first end and a second end, and an elongated screw shaft having a first end and a second end, said first end of said screw shaft being detachably connected to said second end of said driving shaft by a detachable connection, said screw shaft having a generally continuous screw positioned about its periphery, which screw is adapted to transport a substance located in a hopper or other container.

The driving shaft comprises a tube, with a generally cylindrical connecting rod being positioned within said tube; and the screw feeder further comprises means for moving said connecting rod generally axially within said tube.

The connecting rod includes a recessed portion at said second end, said recessed portion having a plurality of generally axial slits which separate a circumferential wall portion of said connecting rod into a plurality of substantially parallel circumferential portions. The recessed portion includes a generally frustoconical lower surface, wherein the diameter of said frustoconical lower surface portion gradually increases, in a direction towards said second end of said drive shaft.

The first end of said screw shaft comprises a base end which is adapted to be inserted into said recessed portion, said first end of said screw shaft also comprising a tapered generally frustoconical portion which has a diameter which decreases in a direction towards said first end of said screw shaft. The tapered portion of said screw shaft is adapted to engage said frustoconical portion of said driving shaft.

The screw feeder further comprises a pulley positioned adjacent an upper end of said driving shaft for transmitting power from a driving source to rotate said driving shaft and said screw shaft when said screw shaft is connected to said driving shaft; and the screw feeder can be used in combination with a hopper adapted to retain a particulate substance or gel-like substance, wherein said second end of said screw shaft is positioned within an upper portion of said hopper, and within a pipe connected to said hopper.

The screw feeder can further comprise a nut adapted to engage an outer circumferential face of a second end of said connecting rod, said nut comprising rotatable means for moving said screw shaft axially via connection of said screw shaft with said connecting rod.

The screw feeder driving shaft tube has a tapered inner portion with a minimum inner diameter which is substantially equal to a minimum outer diameter of a frustoconical lower portion of said connecting rod, said frustoconical lower portion and said tapered portion each having an angle of inclination which is substantially the same. The tapered portion of said outer tube has a length which is greater than the length of the frustoconical portion of said connecting rod; and a radial gap can be provided between the outer surface of said tapered portion and the frustoconical portion.

The detachable connection for connecting said second end of said driving shaft to said first end of said screw shaft comprises at least one annular member adapted to surround one of said shafts. The threadless connection can comprise two generally annular members, with a first generally annular member being formed by a lower end of said driving shaft, said first annular member having opposed generally L-shaped slots at a lower end of said first annular member, and a second generally annular member having two inwardly projecting pins protruding radially inwardly from the inner peripheral surface of said second annular member, said two inwardly directed pins being adapted to be detachably engaged and retained by respective L-shaped slots. The second annular member comprises first and second opposed generally cylindrical openings which are adapted to be aligned with a generally cylindrical bore located in said first end of said screw shaft, said feeder further comprising an elongated locking pin which is adapted to be inserted through said opposed openings and said bore in order to position said second annular member on said screw shaft.

The driving shaft includes an outer tubular member, with an inner connecting rod positioned inside the tube, said inner connecting rod comprising a generally solid cylindrical first member having a lower end with an opening extending therethrough, and a second member having a plurality of generally axially arranged slits, wherein a top end of said second member and a bottom end of said solid member are connected to each other by a generally frustoconical pin inserted into aligned openings in said solid member and said open tubular member.

BRIEF DESCRIPTION OF THE DRAWINGS

The above-noted advantages, features and objects of the present invention are more fully discussed hereinafter with respect to the following views, wherein like reference numerals are used to describe similar parts in the several views, and wherein.

DETAILED DESCRIPTION OF THE DRAWINGS

Figure 1:
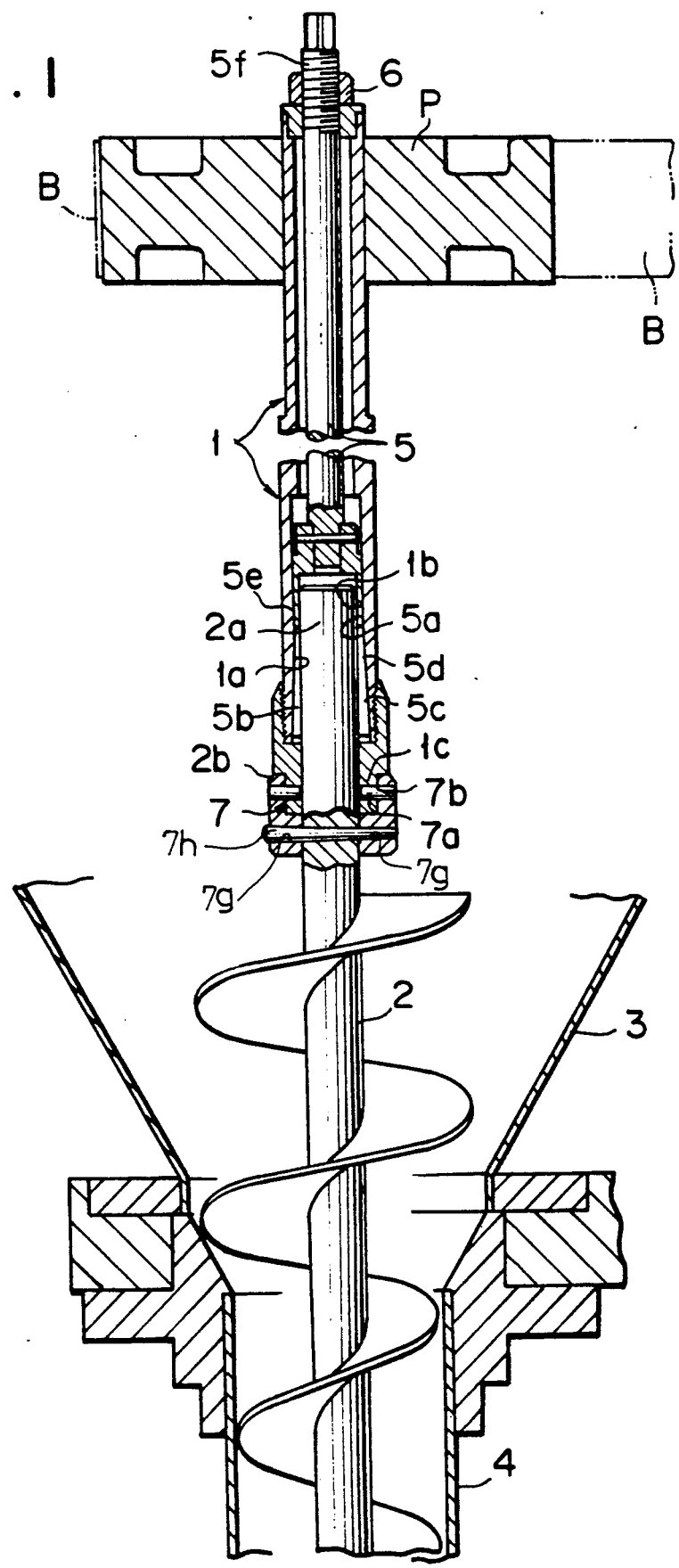
FIG. 1 is a vertical, sectional, front-elevational view of a first embodiment of a screw feeder having a screw shaft connected to a drive shaft.

Referring to the drawings in further detail, one embodiment of the present invention will be described with specific reference to the drawings.

As shown in FIG. 1, a pulley P is provided along an upper portion of a driving shaft 1 which is formed in a cylindrical shape. Power from a driving source is transmitted by belt B to rotate driving shaft 1 and a screw shaft 2 which is adapted to be detachably connected to a lower end of the driving shaft 1, so that a particulate or a gel-like substance, e.g., in hopper 3 can be transported, in a fixed amount, through the spacing which exists between the screw shaft 2 and the cylindrical outer pipe 4.

Figure 2:
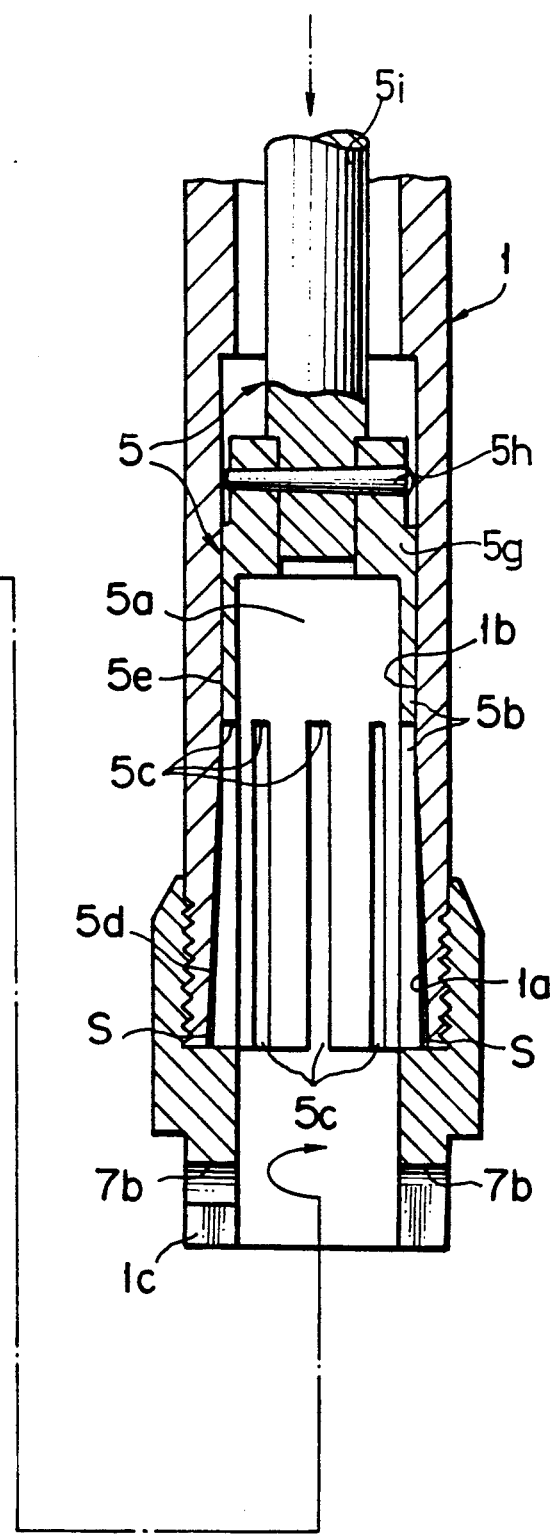
FIG. 2 is an exploded, vertical sectional view showing, in partially enlarged fashion, a position in which the screw shaft is not connected to a drive shaft.

A connecting rod 5 is mounted for upward and downward reciprocating movement along the inside of a tubular portion of driving shaft 1; and a tapered inner surface portion 1a of the tube (see FIG. 2) is provided for engaging an outer frustoconical surface of a lower portion of the connecting rod 5, the tapered portion being formed on an inner circumferential surface of a lower portion of the driving shaft 1, so that the inner diameter of the tapered portion will gradually increase in a downwardly viewed direction. A nut 6, for engaging an outer threaded circumferential face 5f of an upper portion of connecting rod 5, is provided at an upper end of drive shaft 1. The nut can be rotated/turned, but cannot be moved either upwardly or downwardly. As shown in FIG. 2, an upper solid portion 5i of the connecting rod is attached to lower portion 5g by a frustoconical locking pin 5h, which extends through aligned openings (unreferenced) in the two portions A recessed portion 5a of rod 5, having substantially the same diameter as base end 2a of shaft 2, i.e., the upper end of screw shaft 2, is provided axially at a lower end of connecting rod 5, while slits 5c, which divide circumferential wall 5b of recessed portion 5a into a plurality of axially extending portions, are axially provided at the lower end of connecting rod 5. A frustoconical surface portion 5d is formed along an outer circumferential surface of recessed portion 5a in opposed relation to the tapered portion 1a of the drive shaft, such that the outer diameter of the frustoconical portion gradually increases in a direction viewed downwardly.

Tapered portion 1a and frustoconical surface portion 5d are formed so that the minimum inner diameter of the tapered portion 1a, and the minimum outer diameter of the frustoconical face portion 5d, are substantially the same; and so that the inclination angle of tapered portion 1a and the inclination angle of frustoconical face portion 5d are made substantially the same. This is achieved by forming the tube to have an inner diameter tubular portion 1b which is provided contiguously above the tapered portion 1a, which is adapted to slideably contact outer tubular portion 5e, which is provided contiguously above conical face portion 5d. The outer diameter of the tubular portion 5e is substantially equal to the inner diameter of tube portion 1b, with a small (Vertical) gap between the ends of these sections (see FIG. 1) in order to permit upward and downward sliding movement. The vertical length of the tapered portion 1a in the upward and downward directions is made greater than the length of the conical face portion 5d in upward and downward directions, so that the maximum inner diameter of tapered portion 1a will be greater than the maximum outer diameter of frustoconical face portion 5d.

Accordingly, when the maximum outer diameter position of the frustoconical surface portion 5d reaches the same height as the maximum inner diameter portion of the tapered portion 1a, during downward movement of connecting rod 5, a gap S is formed between the conical surface portion 5d and the tapered portion 1a in order to allow the circumferential wall 5b of recessed portion 5a to be expanded, due to the existence of slits 5c.

Further, a threaded portion 5f, adapted to engage an inner circumferential face of nut 6, is provided on an outer circumferential face of an upper portion of connecting rod 5 (see FIG. 1); and threaded portion 5f is moved either upwardly or downwardly by operating-/turning nut 6.

Figure 3:
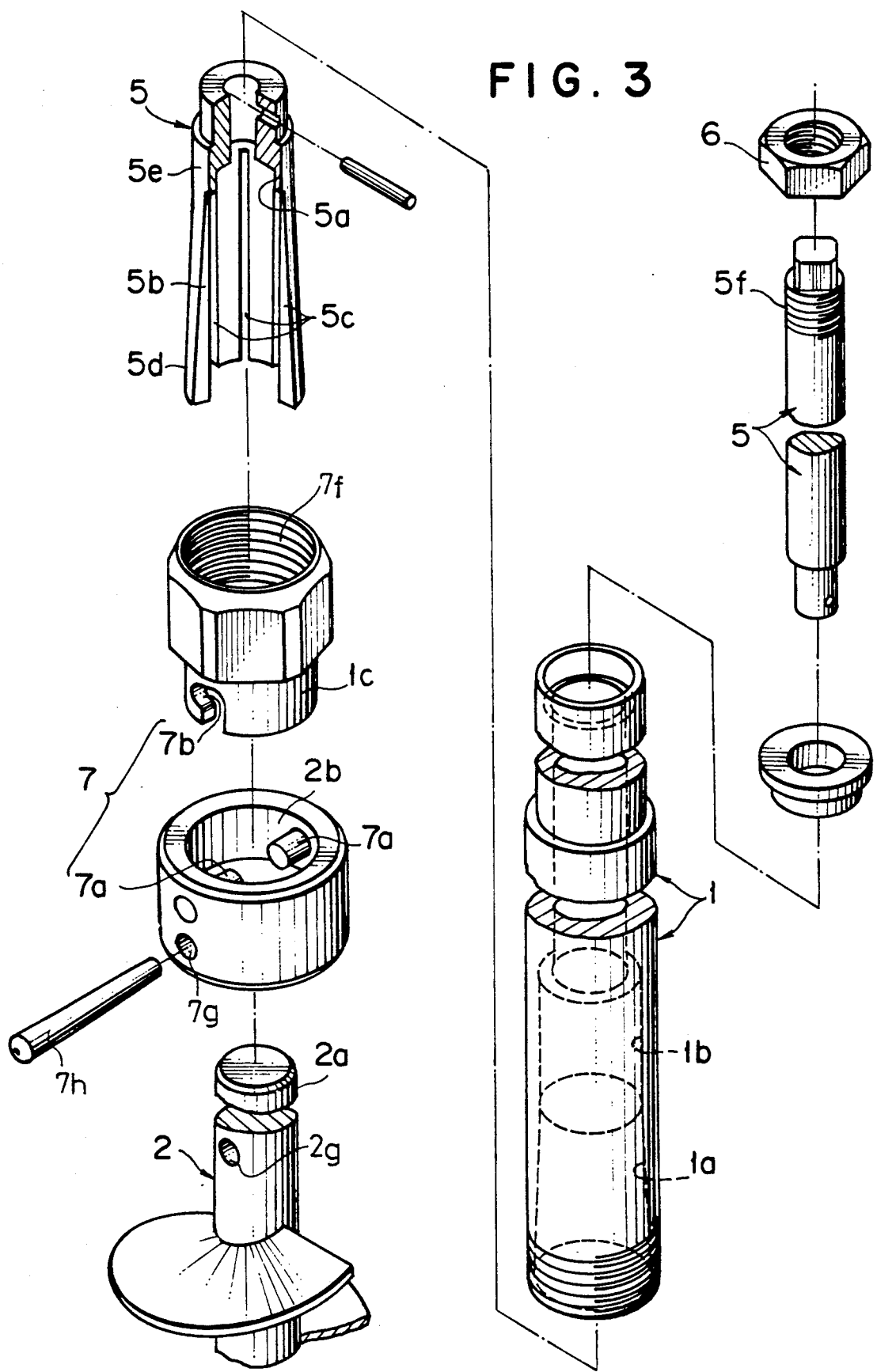
FIG. 3 is a fragmentary, exploded perspective view of essential components of the screw feeder of FIGS. 1 and 2.

Further, a temporary, i.e., detachable fastening mechanism 7 for driving shaft 1 and screw shaft 2, is provided at a lower end of driving shaft 1. The temporary fastening mechanism 7 comprises two annular members 2b, 1c, as shown in FIG. 3. Pins 7a of member 2b extend in a direction perpendicular to the direction of the axes of driving shaft 1 and screw shaft 2. Each pin is adapted to engage a corresponding recess 7b on member 1c.

Annular member 1c includes an internally threaded portion 7f, which is adapted to be threaded onto the exterior lower threaded portion of driving shaft 1 (see FIGS. 1 and 2). The lower annular member 2b includes two inwardly protruding locking pins 7a,7a, and two through holes 7g,7g which are diametrically aligned and which are adapted to receive a frustoconical locking pin 7h, which extends through holes 7g, 7g and through bore 2g in screw shaft 2, as shown in FIGS. 1 and 2.

In the present invention, a pair of inverted L-shaped recesses 7b,7b are formed along a diagonal/diametric line in a circumferential wall of the lower portion of pipe body 1c, which pipe body is screwed onto a lower end of driving shaft 1 as shown in FIG. 3; and a cylindrical body 2b, adapted to be interfit, along the axial direction, with a lower end of pipe body 1b, is securely mounted on an upper portion of screw shaft 2 by locking pin 7h. Horizontal pins 7a of member 2b, project inwardly along a diagonal line from an inner surface of a circumferential wall of cylindrical body 2b, and towards recesses 7b,7b (when the driving shaft and screw shaft are attached).

Subsequently, a method of mounting and detaching driving shaft 1 and screw shaft 2 will be described in detail.

Initially, if nut 6 is manually turned so as to move connecting rod 5 downwardly when the screw shaft 2 is not connected to driving shaft 1, then a gap S is formed between the frustoconical face portion 5d and the tapered portion 1a of shaft 1, as shown in FIG. 2.

If, in this condition, base end 2a of screw shaft 2 is then inserted into recessed portion 5a, and pins 7a,7a are individually fitted into recesses 7b,7b, whereafter screw shaft 2 is pushed upwardly, then the circumferential wall 5b of recessed portion 5a will be expanded so that the base end 2a is fitted along an inner circumferential surface of circumferential wall 5b. Further, if screw shaft 2 is then turned, pins 7a,7a are individually moved in a circumferential direction along recesses 7b,7b, are then engaged in an axial direction, and are temporarily fastened within the recesses.

Thereafter, if nut 6 is turned manually so as to move connecting rod 5 upwardly, conical face portion 5d will be moved upwardly via an upward movement so that it will be fit in a wedge-like fashion between the outer circumferential face of base end 2a of screw shaft 2, and the tapered portion 1a, as shown in FIG. 1; and screw shaft 2 and driving shaft 1 will be connected to each other by way of circumferential wall 5b of recessed portion 5a so that the "three," i.e., the screw shaft, driving shaft, and connecting rod, will be integrally connected to one another.

Accordingly, if driving shaft 1 is then rotated, both connecting rod 5 and screw shaft 2 will be rotated so as to transport/move a particulate or gel-like substance which may be present in the form of a gel in hopper 3.

Conversely, screw shaft 2 will come off of driving shaft 1 and connecting rod 5, and can be separated therefrom, if the above-noted procedure is followed in a reverse fashion.

It should be noted that temporary fastening mechanism 7 need not be the only one which must necessarily be provided, and that the structure of the present invention is not necessarily limited to that which is shown in the attached drawings.

With the above-noted structure, the present invention has numerous advantages over the prior art. Because when the base end of the screw shaft is pushed into the recessed portion in such a way that the connecting rod is moved toward the screw shaft, and the frustoconical face portion and the tapered portion are not engaged with each other but instead have a gap between them, then the circumferential wall of the recessed portion will be expanded so that the connecting rod will be fitted into the recessed portion of the drive shaft. Then, if the connecting rod is moved in an opposite direction, the frustoconical face portion will be engaged with the tapered portion so as to compress and tighten the circumferential wall of the recessed portion so that the driving shaft and the screw shaft will be integrated with each other, with the screw shaft and the driving shaft being removably connected to each other without using a screw.

Accordingly, when compared to a conventional screw feeder in which a screw shaft and a driving shaft are connected to each other by a screw, the present invention avoids the problems of having the attaching screw loosening and coming off upon rotation, as well as avoids the problem of the screw being mixed into a particulate or gel-like substance which is being transported. As a result, the screw feed of the present invention is safer than that of the prior art. Additionally, no screw will fall between the hopper and the screw shaft, and the substance in the hopper will thus not likely stick to the screw, thereby improving the sanitary properties of the invention. No additional tools are needed to separate the drive and screw shafts, and the operation of the system will become enhanced.

While the present invention has been described with respect to a specific embodiment thereof, other embodiments and features are contemplated which would be within the scope of the claims appended hereto.

What is claimed is:

1. A screw feeder having an outer pipe and a hopper, the outer pipe being positioned vertically below a lower end of said hopper, said outer pipe including a screw shaft adapted to transport a substance in said hopper in response to rotation of a driving shaft which is connected to said screw shaft, said driving shaft comprising a tube, with a connecting rod being positioned on the inside of said tube, said connecting rod being adapted to reciprocate along the axial direction of said driving shaft, said driving shaft further comprising a recessed portion into which a base end of said screw shaft is positioned, and slit portions which comprise means for dividing a circumferential wall of said recessed portion in a generally circumferential direction, said slit portions being formed in a generally axial direction at one end of said connecting rod, a frustoconical face portion being provided along an outer circumferential surface of said circumferential wall of said recessed portion, wherein the diameter of said frustoconical portion gradually increases in a direction towards said screw shaft, a tapered portion being formed, in opposed relationship to said frustoconical portion, along an inner circumferential face of said tube, said tapered portion being adapted to engage said frustoconical portion of said connecting rod in an axial direction.

2. A screw feeder in accordance with claim 1, wherein said connecting rod comprises a generally cylindrical connecting rod positioned within said tube.

3. A screw feeder in accordance with claim 2, further comprising means for moving said connecting rod generally axially within said tube.

4. A screw feeder in accordance with claim 3, wherein said recessed portion is positioned at one end of said rod, said slit portions which separate separating a circumferential wall portion of said connecting rod into a plurality of substantially parallel circumferential portions.

5. A screw feeder in accordance with claim 4, wherein said recessed portion includes a generally frustoconical lower portion, wherein the diameter of said frustoconical portion gradually increases, in a direction towards said drive shaft.

6. A screw feeder in accordance with claim 4, wherein said screw shaft comprises a base end which is adapted to be inserted into said recessed portion.

7. A screw feeder in accordance with claim 1, further comprising a pulley positioned adjacent an upper end of said driving shaft for transmitting power from a driving source to rotate said driving shaft and said screw shaft when said screw shaft is connected to said driving shaft.

8. A screw feeder in accordance with claim 7, in combination with a hopper adapted to retain a particulate substance or gel-like substance, wherein said screw shaft is positioned within an upper portion of said hopper, and within a pipe connected to said hopper.

9. A screw feeder in accordance with claim 2, further comprising a nut adapted to engage an outer circumferential face of a second end of said connecting rod, said nut comprising rotatable means for moving said screw shaft axially via connection of said screw shaft with said connecting rod.

10. A screw feeder in accordance with claim 2, wherein said driving shaft tube has a tapered inner portion with a minimum inner diameter which is substantially equal to a minimum outer diameter of a frustoconial portion of said connecting rod, said frustoconical portion and said tapered portion each having an angle of inclination which is substantially the same.

11. A screw feeder in accordance with claim 10, wherein the tapered portion of said outer tube has a length which is greater than the length of the frustoconial portion of said connecting rod.

12. A screw feeder in accordance with claim 10, wherein a radial gap exists between the outer surface of said tapered portion of said tube and the inner frustoconical portion of said connecting rod.

13. A screw feeder in accordance with claim 1, further comprising at least one annular member adapted to surround one of said driving and screw shafts.

14. A screw feeder in accordance with claim 13, comprising two generally annular members, a first generally annular member formed at a lower end of said driving shaft, said first annular member having opposed generally L-shaped slots, and a second generally annular member having two inwardly projecting pins protruding radially inwardly from an inner surface of said second annular member, each of said two inwardly directed pins being adapted to be detachably engaged and retained by respective L-shaped slots.

15. A screw feeder in accordance with claim 14, wherein said second annular member comprises first and second opposed generally cylindrical openings which are adapted to be aligned with a generally cylindrical bore located in an end of said screw shaft, said screw feeder further comprising an elongated locking pin which is adapted to be inserted through said opposed openings and said bore in order to position said second annular member on said screw shaft.

16. A screw feeder in accordance with claim 1, wherein said driving shaft includes an outer tubular member, with said connecting rod positioned within said tubular member, said connecting rod comprising a generally solid, cylindrical first member having a lower end with an opening extending therethrough, and a second member having a plurality of generally axially arranged slits, wherein a top end of said second member and a bottom end of said solid member are connected to each other by a generally frustoconical pin inserted into aligned openings in said solid member and said first member.

* * * * *

UNITED STATES PATENT AND TRADEMARK OFFICE
CERTIFICATE OF CORRECTION

PATENT NO. : 5,183,148
DATED : February 2, 1993
INVENTOR(S) : Fumio Kondo

It is certified that error appears in the above-indentified patent and that said Letters Patent is hereby corrected as shown below:

At column 5, line 22 of the printed patent, change "Vertical" to ---vertical---.
    At column 7, line 54 (claim 4, line 3) of the printed patent, delete "which separate".

Signed and Sealed this

Twelfth Day of April, 1994

Attest:

BRUCE LEHMAN

*Commissioner of Patents and Trademarks*

*Attesting Officer*